3 Sheets—Sheet 1.
A. J. ROBERTS.
MACHINE FOR THE MANUFACTURE OF HORSESHOES.
No. 67,910. Patented Aug. 20, 1867.
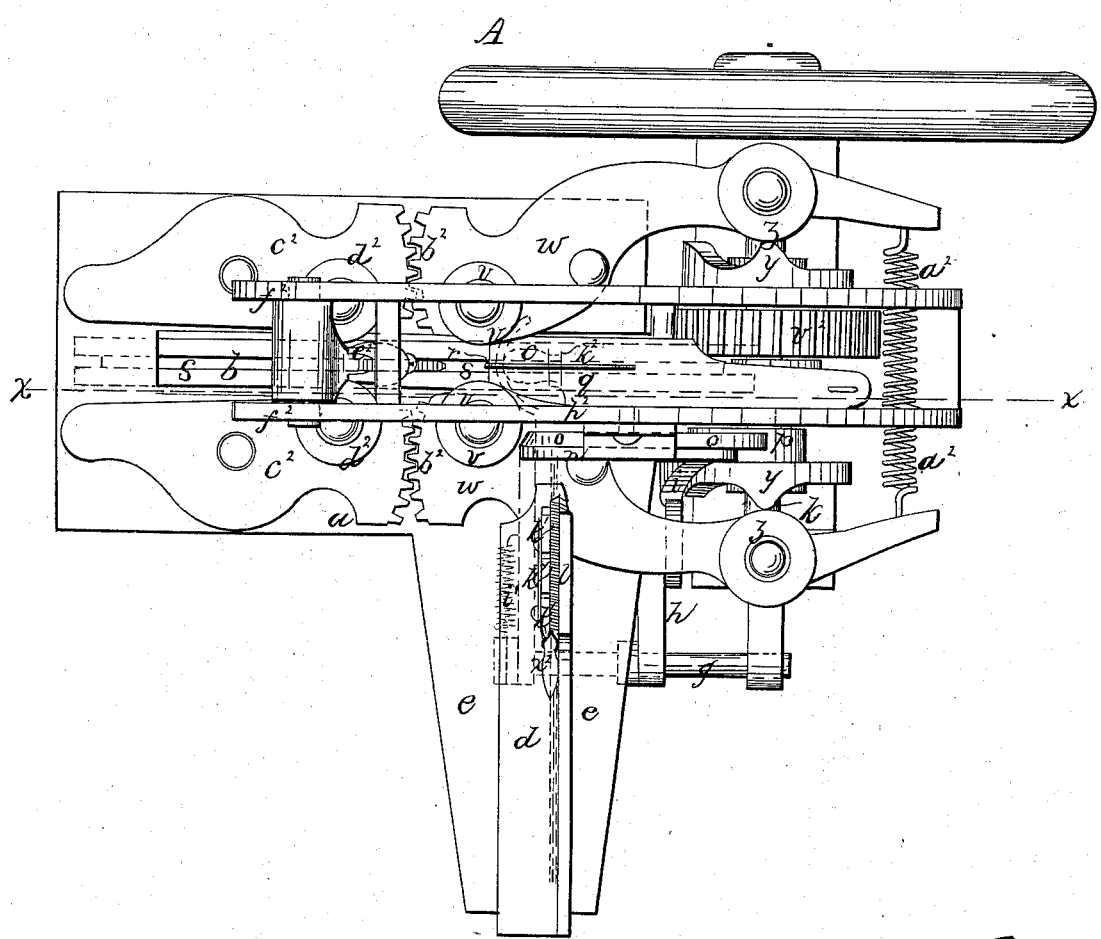
Witnesses:
S. B. Kidder
A. W. Frothingham
A. J. Roberts
Inventor
Crosby & Gould
Attys.

3 Sheets—Sheet 2.
A. J. ROBERTS.
MACHINE FOR THE MANUFACTURE OF HORSESHOES.
No. 67,910. Patented Aug. 20, 1867.
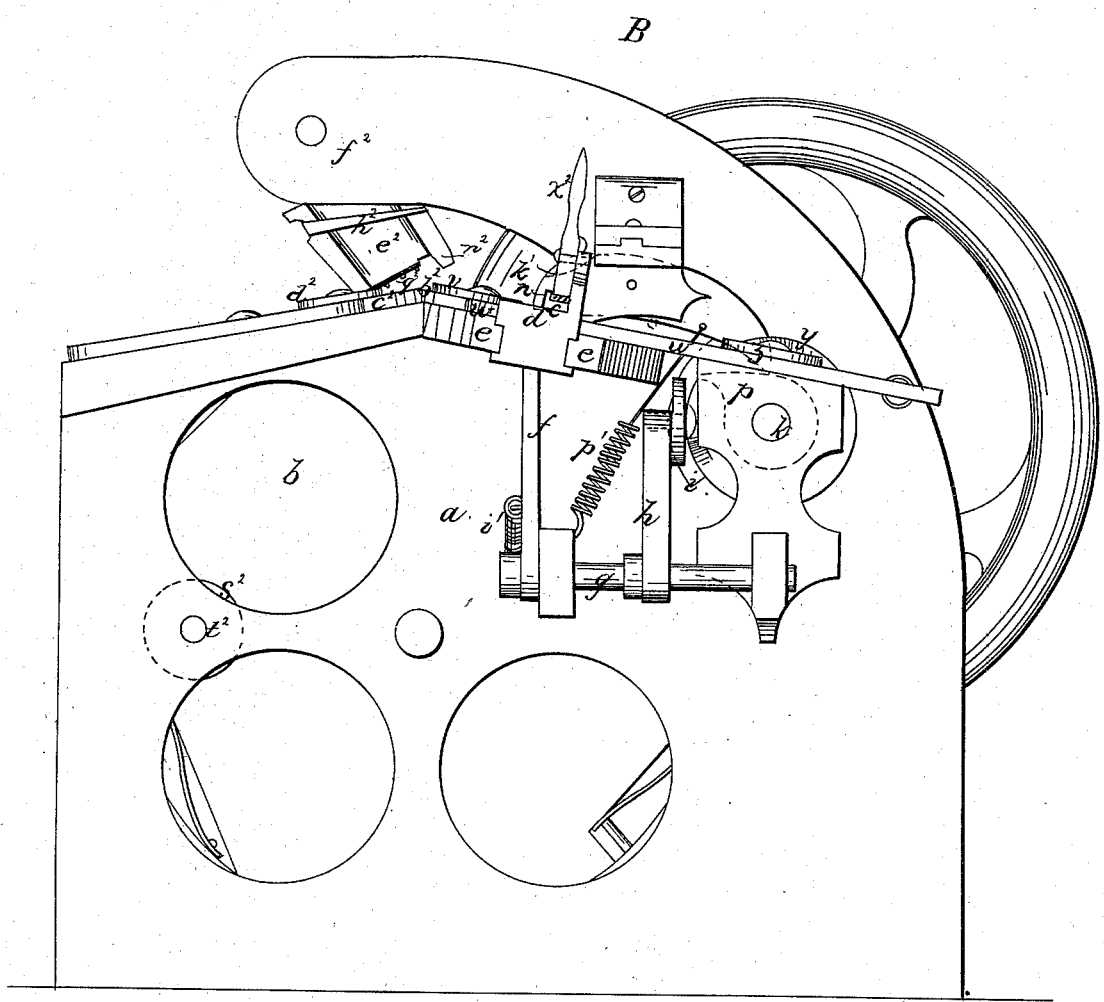

A. J. ROBERTS.
MACHINE FOR THE MANUFACTURE OF HORSESHOES.
No. 67,910.   Patented Aug. 20, 1867.
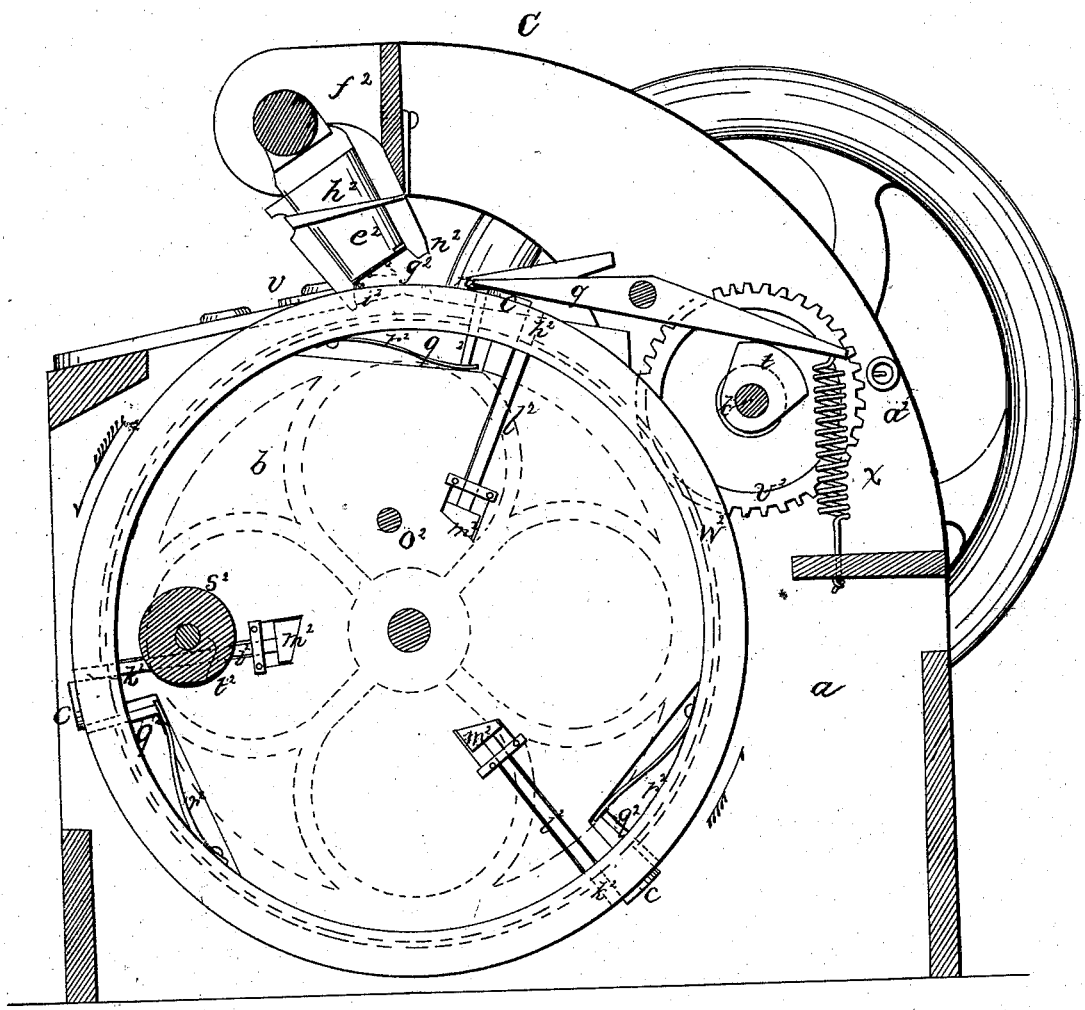

United States Patent Office.

A. J. ROBERTS, OF BOSTON, ASSIGNOR TO HIMSELF AND B. F. BROWN, OF DORCHESTER, MASSACHUSETTS.

Letters Patent No. 67,910, dated August 20, 1867.

---

IMPROVED MACHINE FOR THE MANUFACTURE OF HORSE-SHOES.

The Schedule referred to in these Letters Patent and making part of the same.

---

TO ALL WHOM IT MAY CONCERN:

Be it known that I, A. J. ROBERTS, of Boston, in the county of Suffolk, and State of Massachusetts, have invented certain new and useful improvements in the Manufacture of Horse-Shoes; and I do hereby declare that the following, taken in connection with the drawings which accompany and form part of this specification, is a description of my invention sufficient to enable those skilled in the art to practise it.

The invention relates to the construction or arrangement of parts, and the method of operation of machines for cutting and forming from bar metal horse-shoes, having the grooves and nail-holes sunk therein and heel-calks turned up therefrom, the bar being automatically fed into the machine, and having each piece to form a shoe in turn cut from its entering end bent round a former or pattern, the nail-holes punched therein, the heel-calks bent up therefrom, and the formed shoe discharged, the invention consisting in the details of construction and arrangement for effecting these results.

The drawings represent a machine embodying the invention, A showing a plan, and B a side elevation of the same, C a sectional elevation taken on the line $x\,x$ of the plan. $a$ denotes a frame, having bearings, in which is mounted a wheel, $b$, on the periphery of which is a series of formers or pattern-blocks, $c$, having the form in outline of the inner edge of a shoe. In line with the upper surface of the wheel, and on one side thereof, is a reciprocating carriage, $d$, upon which the bar to be converted into shoes is placed. This carriage is supported and slides on ways $e$, and is connected to the end of a rocker-arm, $f$, projecting from a rocker-shaft, $g$, upon which shaft another arm, $h$, is fixed, which arm is actuated by a cam, $i$, on the driving-shaft $k$, at each revolution of said driving-shaft, the cam acting against a friction-roll on the arm $h$, and throwing out said arm, thereby turning the shaft $g$, and causing the carriage to be thrown outwardly, while its inward movement is produced by the retraction of a spring, $i^1$. The bar is held down to the surface of the carriage by a series of friction-pawls $k^1$, connected together and pressed against the bar by the action of a spring, $l$, and springs interposed between the adjacent pawls. In being carried toward and over the wheel the end of the bar passes through a guide, $n$, one face of which forms, with a movable cutter or blade, $o$, shears to cut off the blank for each shoe. This blade is hung and turns on a suitable pivot, and is actuated at proper times by a cam, $p$, on the shaft $k$, to force it down, and a spring, $p^1$, to carry it back. When the piece or blank is thus cut off by the blade it lies upon the periphery of the wheel $b$, and is held thereto by a griping-jaw, $q$, having a tooth or projection, $r$, which extends down slightly from its under surface and normally into a peripheral groove, $s$, in the centre of the wheel. The blank is held stationary by this jaw, while the wheel moves on (the jaw being forced against the blank by a cam, $t$, on the shaft $k$,) until a former, $c$, on the wheel comes against the blank. As or just before this former strikes the blank two presser-rolls, $v$, on levers $w$ are pressed up towards and over the opposite sides of the wheel, and as the blank is moved forwards by the former these presser-rolls bend it around the sides of the former, the tooth projecting from the griping-jaw pressing into the blank, and the wheel keeping it in central position or from being carried laterally over in either direction. The action of the rolls brings the blank into the general shape of a shoe, the jaw $q$ rising from the blank by the action of a spring, $x$, as the former carries the blank forwards. The arms of the levers $w$, to which the presser-rolls are applied, are severally pressed inwardly at proper times by side-cams $y$ on the driving-shaft $k$, which act against rolls $z$ on the outer arms of the levers, and they are thrown back after the shoe is formed by the action of a spring or springs, $a^2$. The shape of the cams which operate the levers is preferably such as to cause the rolls $v$ to draw down the ends of the blank somewhat against the edges of the former towards the heels of the shoe. The inner end of each lever $w$ has gear-teeth, $b^2$, which mesh into gear-teeth on a pair of levers, $c^2$, which have presser-rolls, $d^2$, similar to the rolls $v$, said rolls being actuated by movement of the levers $w$, and keeping up the pressure of the blank against the sides of the former as said former and blank pass between them, and especially while the formed blank is being operated upon by a swinging die-block, $e^2$, hung to a head, $f^2$, on the frame $a$, the lower surface of this block having dies or punches $g^2$ for sinking the nail-holes in the surface of the shoes. In normal position the die-block is held up from the wheel, as seen at B, by a spring, $h^2$, and it has extending from it and into the groove $s$ a projection, $i^2$, which, as the former with the blank advances, is struck by the blank and swung down, thereby compressing the dies or punches $g^2$ against and forcing them into the surface of the blank. Just in rear of each former, on opposite sides of the groove, are two calk-benders, $k^2$, fixed upon the outer end of a radial sliding-bar, $l^2$, upon whose inner end is an incline, $m^2$, which when the blank is held between the surface of the wheel and the die block, and while a tail-piece, $n^2$, projects down into the groove $s$ between the heel ends of the blank, strikes a stationary pin, $o^2$, in the frame $a$, and is forced outwardly, thereby bending up the ends of the blank and forming thereof the heel-calks to the shoe, the sliding-bar being drawn into the wheel, after passing the pin $o^2$, by the action of a suitable spring. In front of each former is a shoe-discharger, $q^2$, fixed to one end of a spring, $r^2$, whose other end is fastened to the wheel $b$. In the path of movement of the spring is a roll, $s^2$, turning on a pin, $t^2$, projecting inwardly from the frame, and as each spring strikes and rides against this roll it is pressed outwards, carrying with it the discharger $q^2$, and causing said discharger to expel the formed shoe or blank from the machine. The former-wheel $b$ is driven by a gear, $v^2$, on the main driving-shaft $k$, meshing into a gear, $w^2$, on the shaft of the wheel $b$, and all the movements of the mechanism described for feeding the bar, for cutting from it each blank, for bending the blank around the former, and for carrying it to the punching and calk-bending devices, are effected by the cams and gear located directly on the driving-shaft.

The general operation of the mechanism is as follows: The spring-pawls being raised by a handle, $x^2$, the bar is introduced beneath them, with its front end carried through the guide $n$ and abutted against the blade $o$, the carriage being drawn back to the extent of its outward movement. As the driving-shaft is then revolved, and as the cam $i$ (which has carried back the carriage) passes beyond the friction-roll on the arm $h$, the spring $i^1$ impels the carriage with the bar forward, the blade $o$ having been raised by the action of the spring $p^1$. The forward movement of the bar carries its front end over the wheel $b$ and under the griping-jaw $q$, the end projecting beyond the tooth of said jaw being equal in length to the part between said tooth and the plane of the blade $o^1$. The continued movement of the wheel next causes the jaw to be forced down by its cam $t$, (its tooth pressing into the bar,) and the blade $o$ is at the same time carried down by its cam $p$ and severs the blank. As the wheel moves on, one of the formers $c$ on its periphery strikes the blank and carries it on with the wheel, and just as or before the former comes opposite to the presser-rolls $v$, said rolls are carried inwards by the cams $y$, and bend the blank around and up to the edge of the former, as the blank moves on. The bent blank next strikes the projection $i^2$ of the die-block $e^2$, which brings said block down upon the shoe-blank, and causes its punches or dies to sink the nail-holes in the blank, and while the block is thus operating the rolls $d^2$ are pressed up against the blank and prevent the metal from spreading under the action of the punches. At the same time the punches are operating the calk-benders are pressed up by the inclines, as before set forth, and finally the shoe is thrown from the wheel by the discharger $u^2$.

I claim, in combination with the series of movable formers or pattern-blocks, the swinging die-block $e^2$, when arranged to operate as set forth.

Also, in combination with the swinging die-block, the auxiliary presser-rolls $d^2$, actuated by the levers which carry the rolls $v$, substantially as described.

Also, in combination with revolving formers and the bending rolls, the calk-benders, operating substantially as set forth.

Also, in combination with the movable formers and bending mechanism, the dischargers $q^2$, operated substantially as described.

Also, the arrangement of the formers around the periphery of a wheel, grooved centrally of its periphery, as and for the purpose substantially as described.

Also, the sliding feed-carriage, with its spring-pawls, when arranged in connection with the cutting and bending mechanism, and when operated by the cam on the main shaft, substantially as described.

Also, in combination with the bending mechanism, the griping-jaw $q$, for holding the bar while being cut, and the tooth $r$, for holding the blank at its centre to prevent it from sliding endwise as the bending rolls begin to act, substantially as set forth.

Also, the cutting-blade $o$, when arranged to operate in combination with the feeding mechanism, movable former-block, and bending-rolls, and when operated by the cam on the main shaft, substantially as described.

Also, in a horse-shoe machine, the described arrangement of the feeding, cutting, griping, and bending mechanism, to be all operated directly from the main driving-shaft, substantially as described.

Also, the arrangement around the periphery of a wheel of a series of formers or pattern-blocks, operating in succession with the described bending mechanism, substantially as set forth.

A. J. ROBERTS.

Witnesses:
F. GOULD,
J. B. CROSBY.